United States Patent [19]

Yarick et al.

[11] 4,177,548
[45] Dec. 11, 1979

[54] METHOD AND DEVICE FOR ASSEMBLING COAXIALLY INTERFITTING PARTS

[75] Inventors: Jon R. Yarick, Walbridge, Ohio; Nelson J. Franks, Lambertville, Mich.

[73] Assignee: Owens-Illinois, Inc., Toledo, Ohio

[21] Appl. No.: 906,496

[22] Filed: May 16, 1978

[51] Int. Cl.² ............... B23P 11/02; B23P 19/02; B21D 51/46
[52] U.S. Cl. ............... 29/453; 29/235; 29/773; 29/797; 29/809; 113/80 D
[58] Field of Search ............... 29/430, 450, 453, 235, 29/797, 773, 809; 113/80 D

[56] References Cited

U.S. PATENT DOCUMENTS

| | | | |
|---|---|---|---|
| 2,154,508 | 4/1939 | Jonsson | 113/80 D X |
| 2,200,844 | 5/1940 | Johnson | 113/80 D |
| 2,331,269 | 10/1943 | Frank | 113/80 D |
| 2,853,770 | 9/1958 | Thorn et al. | 29/797 X |
| 3,024,523 | 3/1962 | Donaldson | 29/785 X |
| 3,378,907 | 4/1968 | Dixon | 29/453 UX |
| 3,466,731 | 9/1969 | Acton et al. | 29/773 X |
| 3,538,583 | 11/1970 | Galockin et al. | 29/773 X |
| 3,740,821 | 6/1973 | Von Bredow | 29/773 X |
| 3,959,061 | 5/1976 | Renck et al. | 113/80 D X |

*Primary Examiner*—Charlie T. Moon
*Attorney, Agent, or Firm*—John R. Nelson; Myron E. Click; David H. Wilson

[57] ABSTRACT

A method and device for assembling pre-shaped pairs of coaxially mating parts in interfitting assembled relationship one within the other and briefly embodying the concepts of rotating the mating parts in unassembled positionally oriented relationship through a first arcuate path with the corresponding interfitting portions thereof disposed transversely of their respective rotational planes and in adjacent confronting relationship with one another, and concurrently rotating an axially elongated assembly member in rotational synchronization with the mating parts and through a second arcuate path deployed in adjacent oblique planar relationship with the arcuate path of rotation of the mating parts to thereby direct the assembly member to travel along an arcuate path disposed to cause the assembly member to uniformly advance and retreat relative to the arcuate path of rotation of the mating parts and during such advance to forcefully urge the mating parts into assembled interfitting relationship one within the other.

The method and device are particularly suitable for the assembly of closure caps with mating, coaxially interfitting members such as insert liners and gaskets, and the concepts involved are also applicable for assembly of closure caps with various other mating, coaxially interfitting members such as, among others, vials, bottles, jars and various other types of containers.

Moreover, the structural and operational concepts are especially suitable for utilization in production-line assembly operations for automatically and rapidly assembling a continuous succession of mating and coaxially interfitting parts.

21 Claims, 5 Drawing Figures

METHOD AND DEVICE FOR ASSEMBLING COAXIALLY INTERFITTING PARTS

BACKGROUND OF THE INVENTION

1. Field of the Invention

The present invention relates generally to innovations and improvements in methods and means for assembling pre-shaped, mating parts in interfitting assembled relationship one within the other. In more particular respects the invention pertains to methods and means for assembling closure caps with coaxially interfitting components, and in more specific respects for assembling inserts, such as insert liners or the like, in snap-fit assembled relationship within such closure caps.

2. Description of the Prior Art

In the past, numerous types of assembly methods and devices have been employed for assembling pre-shaped, mating parts, or components, into interfitting assembled relationship. Such methods and devices range in diversity from manual methods and devices to complex, fully automated methods and machines. No less diverse is the range of methods and machines, or devices, which have evolved for assembling various types of press-on and threaded closure caps with a variety of coaxially interfitting members including, without limitation, vials, jar, bottles and the like, as well as various types of closure inserts such as gaskets, insert liners and the like.

So far as is known, however, the various prior art methods and devices for accomplishing automated assembly of closure caps with interfitting members of the type described involves the utilization of an abundant accoutrement of moving parts to provide necessary motion translation, such as gear trains, cam rollers and associated cam tracks, pivot joints and the like. Obviously, such an abundance of moving parts enhances the prospects of the incurrence of constant and excessive wear and requires costly and excessive maintenance, replacement and repair of such parts. No less significantly, such assembly devices, or machines, frequently embody hydraulic or pneumatic operational systems which are also subject to similar maintenance and repair problems, and which also are frequently productive of excessive levels of noise pollution.

SUMMARY OF THE INVENTION

Briefly, the present invention embodies unique means and method for interfitting coaxially mating parts in assembled relationship one within the other, and which obviate the complications associated with the usage of prior art assembly methods and systems employing gear trains, cam rollers, pivot linkages and pneumatic or hydraulic systems and the like. Such complications are avoided by the utilization of means and method embodying the concept of rotating the mating parts, while arranged in adjacent juxtaposed positions, in a first arcuate path and in confronting or oppositely disposed relationship with an assembly member rotating synchronously with the mating parts, but in a plane of rotation deployed in oblique planar relationship with the plane of rotation of the mating parts. The oblique relationship of the planes of rotation causes the assembly member to follow a rotational path which through 180° of rotation uniformly advances towards the rotational path of movement of the mating parts and which through the next succeeding 180° of rotation retreats from the rotational path of movement of the mating parts. Such advancing and retreating movements of the assembly member relative to the mating parts provides a simple and highly reliable means and method for assembly of the mating parts, since the extent of relative obliqueness of the rotational planes provides a means and method for governing the extent of relative advancement and retreat, or, as otherwise stated, the relative stroke of the assembly member with respect to the mating parts. In accordance with the present invention the oblique relationship of the rotational paths of the assembly member and mating parts is correlated to cause the assembly member to advance sufficiently to forcefully urge the mating paths into coaxially assembled relationship one within the other and to thereafter retreat sufficiently to accommodate unobstructed removal of the assembled parts.

In the application of the foregoing concepts in accordance with the principles of the present invention, method and apparatus for the rapid and automatic assembly of a continuous succession of pairs of mating parts is provided in which a first rotatable member is mounted for rotation about a fixed first central axle and has a peripherally interspaced array of pockets in which to individually receive and accommodate a pair of mating, unassembled parts with the interfitting portions thereof positionally arranged in confronting relationship with each other. Confronting and synchronously rotatable with the first rotatable member there is a second rotatable member which is also mounted for rotation about a fixed second central axle which is disposed in angular relationship with the first central axle to thereby orient the second rotatable member in a rotational plane deployed in oblique confronting relationship with the rotational plane of the first rotatable member. Carried in marginally interspaced relationship on the second rotatable member are a host of axially elongated assembly members which are individually disposed in endwise confronting relationship with one each of the pairs of mating parts carried in the pockets of the first rotatable member. By virtue of the oblique relationship of the rotational planes of the first and second rotatable members, synchronous rotation thereof causes the assembly members to travel in an orbital path which successively advances towards and retreats from the orbital path of travel of the pockets in the first rotatable member. During advancement the assembly members are successively advanced into endwise contact with and forcefully urge the confronting mating parts into interfitting, coaxially assembled relationship. During subsequent retreat of the assembly members the resultant assembled parts are successively discharged from each of the pockets at an unloading station positioned in advance of the return arrival of each of the pockets at the loading station to accommodate successive repetition of the assembly operation just described.

Keeping the foregoing in mind, it is an objective of the present invention to provide a method and means for assembling a pre-shaped pair of coaxially interfitting parts, and which is of simplified design and obviates the necessity for utilizing gear trains, cam rollers and the like for motion translation purposes.

Another objective is the provision of a method and device of the foregoing type which is operable without necessitating the employment of hydraulic or pneumatic pressure systems.

A further objective is the provision of a method and device embodying the characteristics of the previously mentioned objectives and which is suitable for rapidly and automatically assembling a continuing succession of mating closure caps and interfitting members.

A still further objective is the provision of a method and device for assembling a pair of mating parts and which embodies the concepts of rotating mating parts, while positioned in disassembled juxtaposed alignment, through a first arcuate path of travel and of rotating an assembly member in rotational synchronization and adjacently interspaced relationship with mating parts and while disposed transversely of an arcuate path of rotation deployed in oblique planar relationship with the plane of rotation of the mating parts, whereby such oblique planar relationship causes the assembly member to uniformly advance and retreat relative to the arcuate path of rotation of the mating parts and during such advance to forcefully urge the mating parts into assembled interfitting relationship with one another.

A more particular objective of the present invention is the provision of a method and means for assembling a preshaped pair of coaxially mating parts which are shaped to fit one within the other and which is characterized by:

rotating the pair of mating parts through a first arcuate path with the corresponding interfitting portions thereof disposed in unassembled confronting relationship;

synchronously rotating an axially elongated assembly member in confronting relationship with the mating parts and through a second arcuate path deployed in interspaced oblique planar relationship with the first arcuate path; and correlating the oblique planar relationship and relative interspacing of the first and second arcuate paths to cause the assembly member to uniformly advance and retreat relative to the first arcuate path and during such advance to forcefully urge the mating parts into assembled interfitting relationship with one another.

The specific nature of the present invention, as well as other objects, features and advantages thereof, will become readily apparent to those ordinarily skilled in the art from the following detailed description taken in conjunction with the annexed drawings wherein, by way of example only, a preferred embodiment of the present invention is illustrated.

DETAILED DESCRIPTION OF A PREFERRED EMBODIMENT OF THE INVENTION

Figure 1:
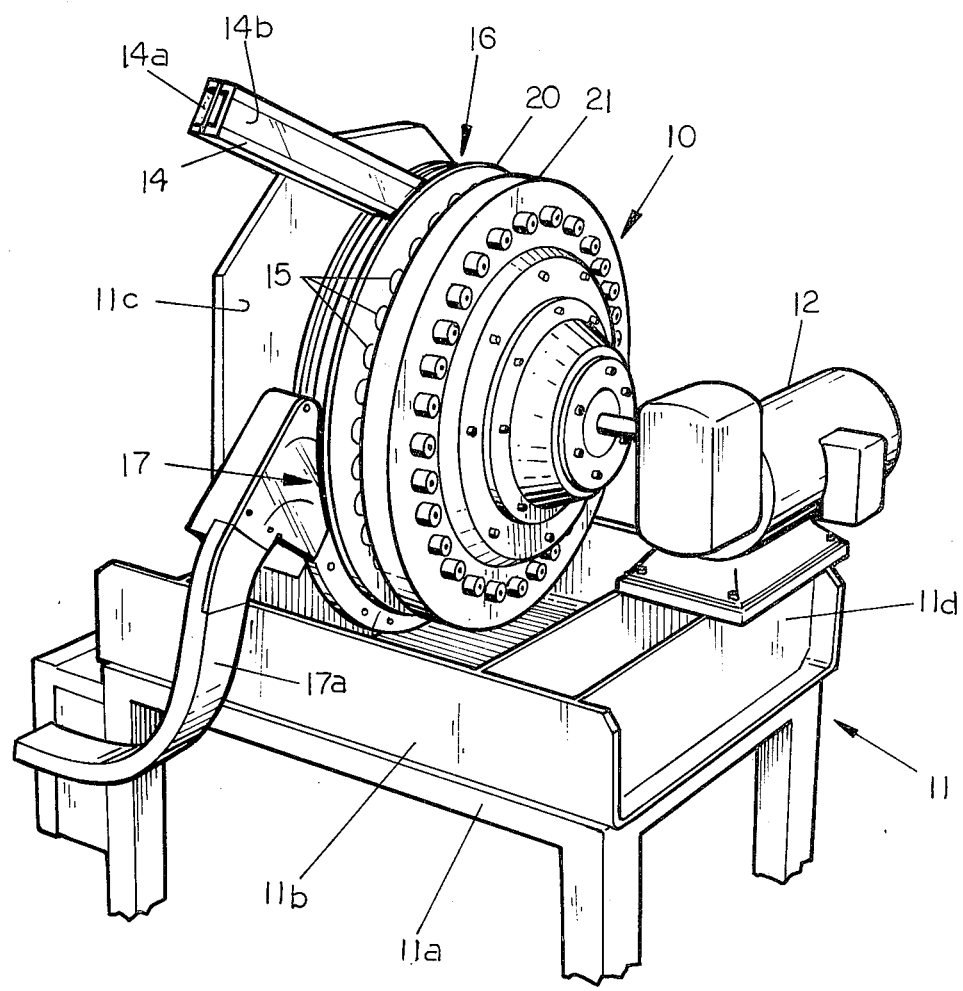
FIG. 1 is a perspective view of the invention shown in a preferred mode embodied in a rotary assembly device for automatically assembling liner inserts in skirted closure caps.
Figure 2:
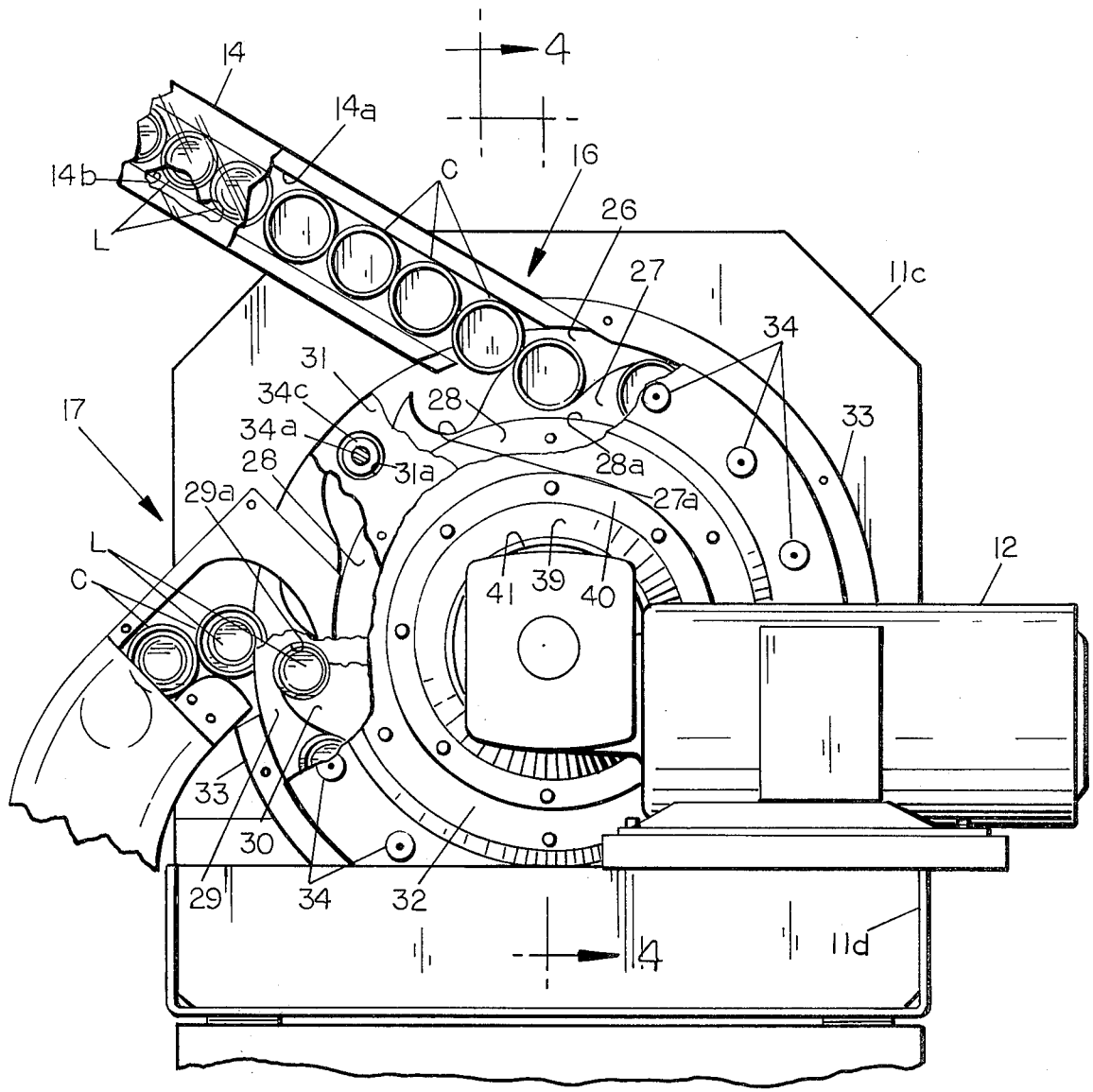
FIG. 2 is an enlarged, fragmentary side elevational view of the device shown in FIG. 1 and particularly depicts the operational character of the device with respect to the manner in which a succession of closure caps and insert liners, or gaskets, are fed or delivered in unassembled condition to a cap loading station and are subsequently discharged in assembled condition at a cap discharge station.

The overall general organizational arrangement and operational interrelationship of the assembly device of the present invention are perspectively depicted in FIG. 1. As illustrated, the assembly device is preferentially embodied in an automatic rotary assembly machine, or device, generally designated at 10, which is suitably supported for operation in an upright position upon a rigid mounting stand 11. To facilitate the employment of a reliable and inexpensive gravitational mode of delivery of closure caps and insert liners, the assembly machine 10 is preferably mounted for operation in a substantially vertically deployed rotational plane, and, for purposes of description only, is directionally indicated as being operatively driven in a clockwise path of rotation by motorized drive means such as a variable speed controlled drive motor 12. Means for feeding a linear succession of mating, unassembled, closure caps and insert liners to the assembly device 10 is provided by delivery means 14 which comprises an axially elongated feed chute compartmented into adjacent axially extending cap and insert chutes 14a and 14b, respectively. As best seen in FIG. 2, the chutes 14a and 14b deliver one each of a linear succession of closure caps C and insert liners L in non-assembled and paired juxtaposed relationship to each of a successive host of rotating marginally interspaced assembly stations 15 provided on the rotary assembly device 10 as the assembly stations successively rotate in an orbital path past a stationary loading station generally indicated at 16. During subsequent rotational travel of each assembly station in a clockwise direction away from the loading station 16, the insert liner, carried by each assembly station is, as will subsequently be described, inserted into assembled relationship within a closure cap. Thereafter, as shown in more detail in FIG. 3, each assembled closure cap and liner are removed from each assembly station 15 at a stationary discharge station, or unloading station, generally designated at 17, and are directed into a discharge chute 17a from which they may be collected and recovered for intended use.

Figure 4:
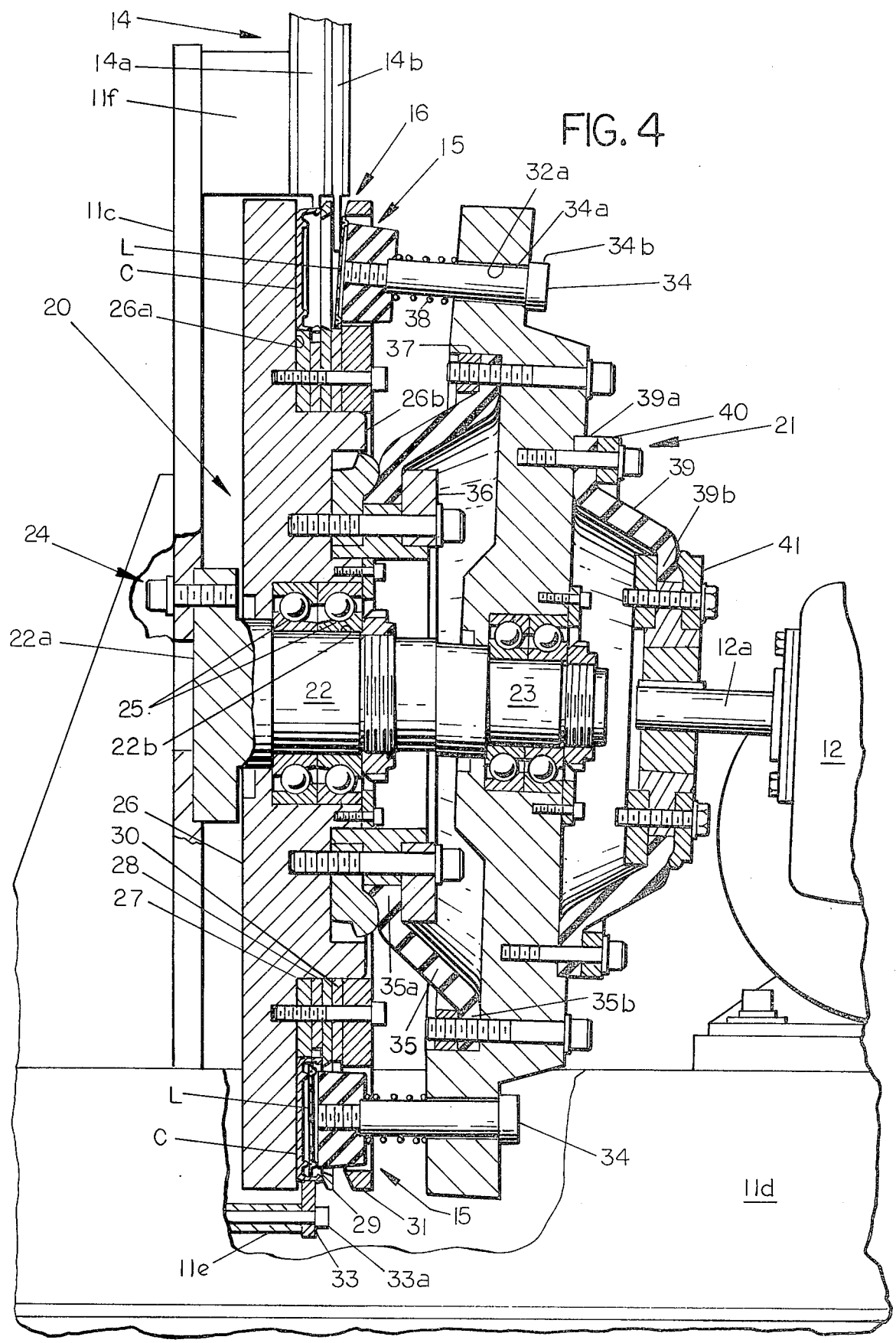
FIG. 4 is an enlarged partially fragmentary, side view of the machine taken substantially along and in the direction of the viewing plane 4—4 in FIG. 2 and showing the rotatable members centrally sectioned for clarity of illustration.

In more detailed respects, the rotary assembly device 10, as indicated in FIG. 4, includes a pair of confronting first and second rotatable members 20 and 21 which are separately mounted on individual fixed central axles 22 and 23, respectively, and, as will be subsequently described, which are adapted to rotate in synchronously timed relationship with one another. As shown, the fixed central axles 22 and 23 are arranged in substantially end-to-end relationship, but with their axes disposed in angularly offset relationship to each other. As thus angularly offset, the fixed axles 22 and 23 deploy the rotatable members 20 and 21 in such manner that they are disposed to rotate in oblique, confronting rotational planes relative to one another.

The axle 22 carrying rotatable member 20 is supported in cantilevered manner by an integral radially enlarged end flange 22a at one axial end which is securely bolted, as at 24, or otherwise rigidly affixed to the upstanding mounting platform 11c. The axle 22 also includes a horizontally disposed central bearing shaft 22b suitably provided with ring bearings 25, or the like, carrying the rotatable member 20 and accommodating free rotational movement thereof about the axle 22.

As further illustrated in FIG. 4, the first rotatable member 20 functions as a carrier member for a plurality of mating closure caps and insert liners during the assembly operation, and is designed to provide a host of marginally interspaced pockets, or chambers, in which to individually receive and orient a closure cap C and a mating insert liner L as the latter are successively dispensed at the loading station 16 by the delivery means 14. Thereafter, each of the paired closure caps and liners are assembled as they are being transported by the assembly stations 15 through an arcuate path leading to the unloading station 17.

Structurally, the first rotatable member 20 generally includes a circular base plate 26 having an inwardly facing side 26a with an inwardly offset, integral central hub 26b disposed in confronting relationship with the second rotatable member 21 and carried by the ring bearings 25 on the axle 22 to accommodate free rotational movement of the base plate 26 relative to the axle 22. Also, on the inwardly facing side 26a of the base plate 26 and concentrically surrounding the central hub 26b there is a host of identical assembly stations 15, which, as shown, are deployed around the margin of the base plate 26 in an equally interspaced array. Each of the assembly stations 15 generally comprises means for receiving a closure cap C at the loading station 16 and rotating the same through an arcuate path to the unloading station 17, means for receiving an insert liner L at the loading station 16 and retaining it in paired confronting relationship with the closure cap C preparatory to assembly within the latter, and means for registering and guiding the insert liner L into coaxially aligned registration with the closure cap C.

Figure 3:
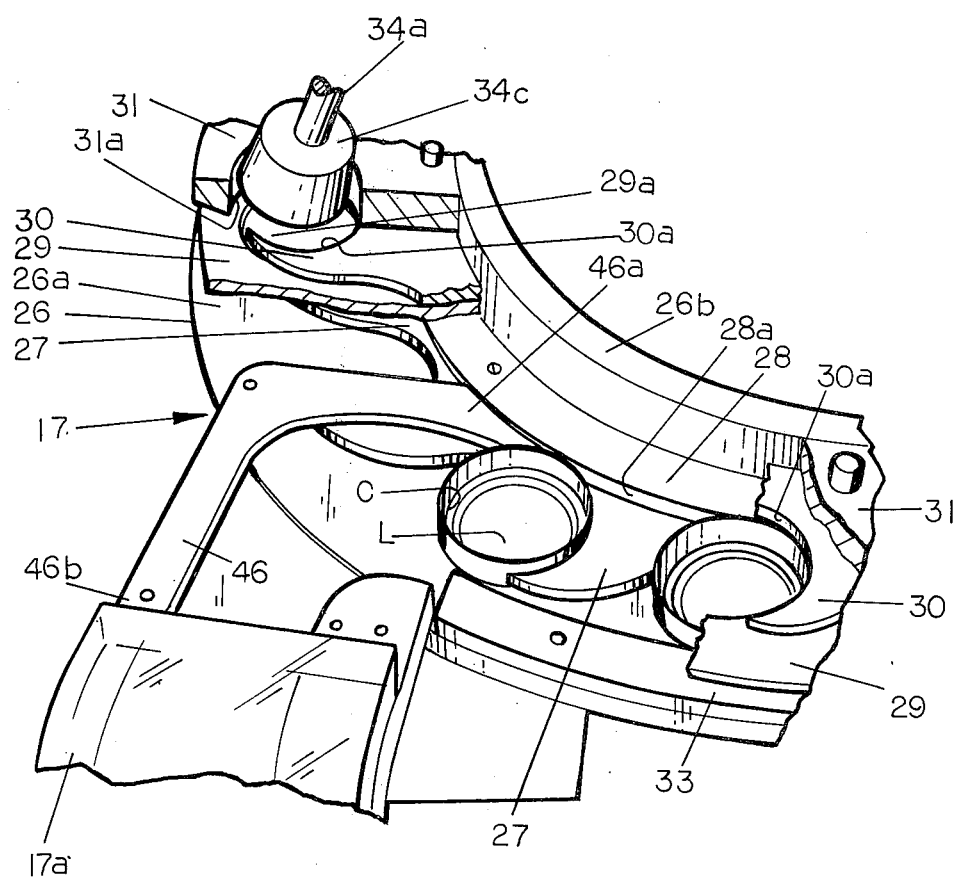
FIG 3 is an isolated fragmentary view in substantially enlarged perspective and more clearly depicting the operational interrelationship of various associated machine parts as the assembled caps and liners arrive and are discharged at the cap discharge station.

In more detailed respects, the functions of the various aforementioned means at each assembly station 15 are structurally embodied in a stacked array of annular collar plates which are nested concentrically around the central hub 26b and securely interlocked to rotate in unison together with the base plate 26. Included among the annular collar plates, there is a peripherally pocketed inner plate, or pocket wheel 27, which is seated against the inwardly facing side 26a of the base plate 26. As best seen in FIGS. 2 and 3, the pocket wheel 27 defines a peripheral array of equally interspaced and generally C-shaped pockets 27a in which to individually receive and transport a closure cap C with the open end of the closure cap facing inwardly towards the second rotatable member 21. Seated in turn upon the pocket wheel 27, there is a spacer plate 28 having an outer peripheral edge 28a terminating radially inward from the innermost reaches of the pockets 27a in the pocket wheel 27. Seated upon the spacer plate 28, and in overlyng interspaced relationship with the pocket wheel 27, there is a guide plate or registration plate 29 defining a marginally interspaced array of transverse apertures 29a which are respectively aligned to coaxially register with a closure cap C located in a pocket 27a of the pocket wheel 27. Additionally, as shown in FIG. 2, the wall surface defining each of the apertures 29a is of frusto-conical configuration and convergently tapers in axial direction towards the pocket 27a to restrict the one axial end of the aperture 29 facing the closure cap C to a size proximately smaller than the opening defined in the open end of the closure cap C.

Seated in turn upon the registration plate 29, there is a peripherally pocketed outer plate, or pocket wheel 30, which, like the inner pocket wheel 27, defines a peripheral array of equally interspaced and generally C-shaped pockets 30a respectively oriented to receive and nest an insert liner L in confronting relationship with one each of the apertures 29a in the registration plate 29. Seated, in turn, upon the pocket wheel 30, there is a marginally apertured retainer plate 31 defining a plurality of equally interspaced apertures 31a respectively aligned in axial registration with one each of the respective pockets 27a and 30a in the pocket wheels 27 and 30 and with one each of the apertures 29a in the registration plate 29. Retention of the pocket wheels 27, 30, the spacer plate 28, the registration plate 29 and the retainer plate 30 in orientational registry with each other and with the base plate 26 is provided by suitable fastening means such as, for example, a marginally interspaced array of bolts, extending transversely through each of the respective plates and pocket wheels and threadably secured into the base plate 26.

The second rotatable member 21, which is carried for rotation about the fixed axle 23, is operative in conjunction with assembly stations 15 on the first rotatable member 20 to urge the respective unassembled insert liners L and closure caps C into interfitting, snap-fit, assembled relationship during the course of rotational travel of each assembly station 15 between the loading and unloading stations 16 and 17, respectively. Incident to such operational features, the second rotatable member 21 includes a circular carrier plate 32 centrally mounted on suitable ring bearings for central axial rotation on the fixed axle 23 in a plane of rotation confronting and angularly deployed from the plane of rotation of the assembly stations 15 on the first rotatable member 20. Defined in the carrier plate 32, there is a marginal array of equally interspaced and transversely extending bores 32a respectively arranged to axially correspond with one each of the apertures 31a in the retainer plate 31. Carried in axial slip-fit relationship within each bore 32a, there is an axially elongated assembly member, or plunger member 34, which also axially and operationally corresponds with an aperture 31a in the retainer plate 31.

As best shown in FIG. 4, each of the axially elongated assembly members, or plunger members 34, comprises a central shank portion 34a slidably and axially received in one each of the bores 32a defined in the carrier plate 32. A radially enlarged should 34b provided on the trailing end of the shank portion of each plunger member is of larger size than the bore 32a and is resiliently biased against the carrier plate 32 by the resilient biasing action provided by a coil spring. As shown, the coil spring 38 is carried on the shank portion 34a in an axially compressed condition by being compressed between the carrier plate 32 and a radially enlarged inserter head, or plunger head 34c which is preferably fabricated from a relatively resilient material, and which is threadably affixed to the leading end of the shank portion 34a. As thus structured, the coil spring exerts a yieldable biasing force against the plunger head 34c and urges each plunger member 34 to axially assume a resiliently constrained, fully extended position projecting axially towards the first rotatable member 20 and with the plunger head 34a in axial alignment with an assembly station 15.

Synchronously timed rotation of the first and second rotatable members 20 and 21 is provided by a flexible, interconnecting, annular collar 35 arranged as an enclosure around the axles 22 and 23 of the rotatable members and having one peripheral edge portion 35a circumferentially secured by an annular clamp ring 36 securely bolted, or otherwise affixed, to the base plate 26 of the first rotatable member 20. Similarly, the other peripheral edge portion 35b of the annular collar is securely fastened by an annular clamp ring 37 securely bolted or otherwise fastened to the carrier plate 32.

The power source for providing corotation, or synchronously timed rotation of the first and second rotatable members is derived from the variable speed control drive motor 12. In this regard, the second rotatable member 21 is shown (FIG. 4) as being coupled to the drive shaft 12a of the drive motor 12 by means of a flexible coupling 39 interconnecting the carrier plate 32 with the base plate 26. However, the employment of a flexible, rather than a rigid, coupling between the carrier plate 32 and the drive shaft 12a is merely a matter of optional preference, since, unlike the intentional angular axial alignment provided between the axles 22 and 23, the drive shaft 12a and the axle 23 may, as shown, be arranged in coaxial alignment and thus obviate the necessity of employing a flexible coupling or similar means of compensating for axial misalignment. Hence, solely by virtue of structural and operational preference, a flexible annular coupling 39 is employed which may be basically of the same general character as the previously described flexible annular collar 35. As shown, the annular coupling 39 is circumferentially secured along its outer peripheral edge 39a and inner peripheral edge 39b respectively by means of a suitable clamp ring 40 bolted to the carrier plate 32 and a collar clamp 41 mounted for rotation with the drive shaft 12a of drive motor 12.

Both of the flexible annular collars 35 and 39 are preferably fabricated from a durable and flexible material such as fiber or wire reinforced rubber or the like. One particularly suitable material for such purposes is commercially available under the trademark PARAflex ® from Dodge Manufacturing Corp. located in Mishawaka, Indiana and is further described in U.S. Pat. No. 2,648,958, and the description of which is incorporated herein by reference.

The extent of axial angularity provided between the axle 22 and 23 is optionally tailored to provide the extent of related axial travel, or stroke, desired to be imparted to the plunger members 34 as they are rotated in an orbital path lying in a plane perpendicular to the central axis of rotation provided by the fixed axle 23. In the preferred version illustrated in FIG. 4, a stroke approximately equal to the depth of the closure cap C is provided and causes each of the plunger members 34 to shift between a fully retracted position (indicated in the upper portion of FIG. 4) and a fully extended position, (indicated in the lower portion of FIG. 4) at an orbital location disposed 180° removed from the fully retracted position. In its fully extended position the plunger member 34 acts to depress, or urge, the liner L into axially assembled relationship within the closure cap C.

Upon rotational departure from the fully extended position each plunger member 34 will commence to uniformly retreat through the ensuing 180° of orbital travel as it returns to the previously mentioned fully retracted position. During the latter, or retreating, phase of orbital travel each plunger member 34 will, prior to its return to a fully retracted position, arrive at a partially retracted position in which it will be totally withdrawn from within the interior confines of the closure cap C, and thereby accommodate unobstructed removal of the closure cap and assembled insert liner L.

Delivery of a mating closure cap C and insert liner L to each of the individual pockets 27a and 30a in the pocket wheels carried by the first rotatable member 20 is provided by the delivery means 14 which is stationarily mounted by a brace to the mounting platform 11c. As shown, the closure cap chute 14a and the insert liner chute 14b, which are arranged side-by-side, slope downwardly towards the assembly device and respectively carry a linear succession of pre-oriented closure caps C and insert liners L. The discharge ends of the chutes 14a and 14b are respectively in alignment with and empty into the pockets 27a and 30a in the pocket wheels 27 and 30. Also, the delivery means is mounted in such position that the delivery location of each closure cap C and mating insert liner L corresponds to an orbital location in which the plunger members 30 will be retracted sufficiently to avoid obstruction of the pockets 30a and preferably the orbital location in which the plunger member 34 has retreated to its fully retracted position. At such delivery location, or loading station 16, a mating closure cap C and insert liner L are gravitationally deposited in each successive pocket 27a and 30a as the pocket wheels 27 and 30 travel past the loading station 16.

At the discharge station, or unloading station 17, an L-shaped, or hook-shaped, deflection arm 46 is positioned to intercept and deflect each assembled closure cap C and insert liner L at a location positionally oriented to follow withdrawal of the plunger member 34 from the closure cap and prior to a return arrival of the closure cap at the loading station 17. The deflection arm 46 which is fastened to the mounting platform 11c comprises an outer mounting end 46a and a hooked inner end 46b which projects into the interspace defined between the inwardly facing side 26a of the base plate 26 and the inner pocket wheel 27 and which opens towards and intercepts and deflects the advancing assembled closure caps into the discharge chute 17a.

An arcuate guide rail 33, which is secured to the mounting platform 11c by suitable fastening means such as bolts 33a, is disposed adjacent to the periphery of the inner pocket wheel 27 and extends between the loading station 16 and unloading station 17 to confine the closure caps C within their respective pockets 27a in the pocket wheel 27 prior to being discharged at the unloading station 17.

MODE OF OPERATION

As best whown in FIGS. 1 and 2, a linear succession of closure caps C and mating flexible insert liners L which have been deposited in properly oriented relationship in their respective delivery chutes 14a and 14b gravitationally descend to the loading station 17 at which location a closure cap and an insert liner are delivered as a mating pair to an assembly station 15 on the first rotatable member 20. Upon delivery to the assembly station 15 the closure cap C is gravitationally directed by the chute into a peripheral pocket 27a defined in the inner pocket wheel 27 and the insert liner L is gravitationally directed by the chute 14a into a peripheral pocket 30 a defined in the pocket wheel 30 and which is arranged in interspaced registered alignment with the pocket 27a. When so positioned in the pockets 27a and 30a, the closure cap C and insert liner L are confined in confronting relationship while separated from one another by the apertured registration plate 29. As thus confined in confronting alignment, the closure cap C and insert liner L are rotated through an arcuate path leading from the loading station 16 to the unloading station 17.

During rotation of the closure cap C and insert liner L between the loading and unloading stations, the second rotatable member 21, which is rotating in synchronously timed relationship with the first rotatable member 20, causes a plunger member 34 to advance from the retracted position at the loading station 16 into endwise contact with the insert liner L and to forcefully depress the insert liner L through the tapered aperture 29a in the guide plate 29 which flexes the edges of the insert liner L and guides it into interfitting coaxially assembled relationship within the closure cap C. Following assembly of the closure cap and insert liner, continued rotation causes the plunger member 34 to retract and totally withdraw from the assembled closure cap prior to the arrival thereof at the unloading station 17 and prior to the return arrival of the plunger member 34 at the loading station 16.

Figure 5:
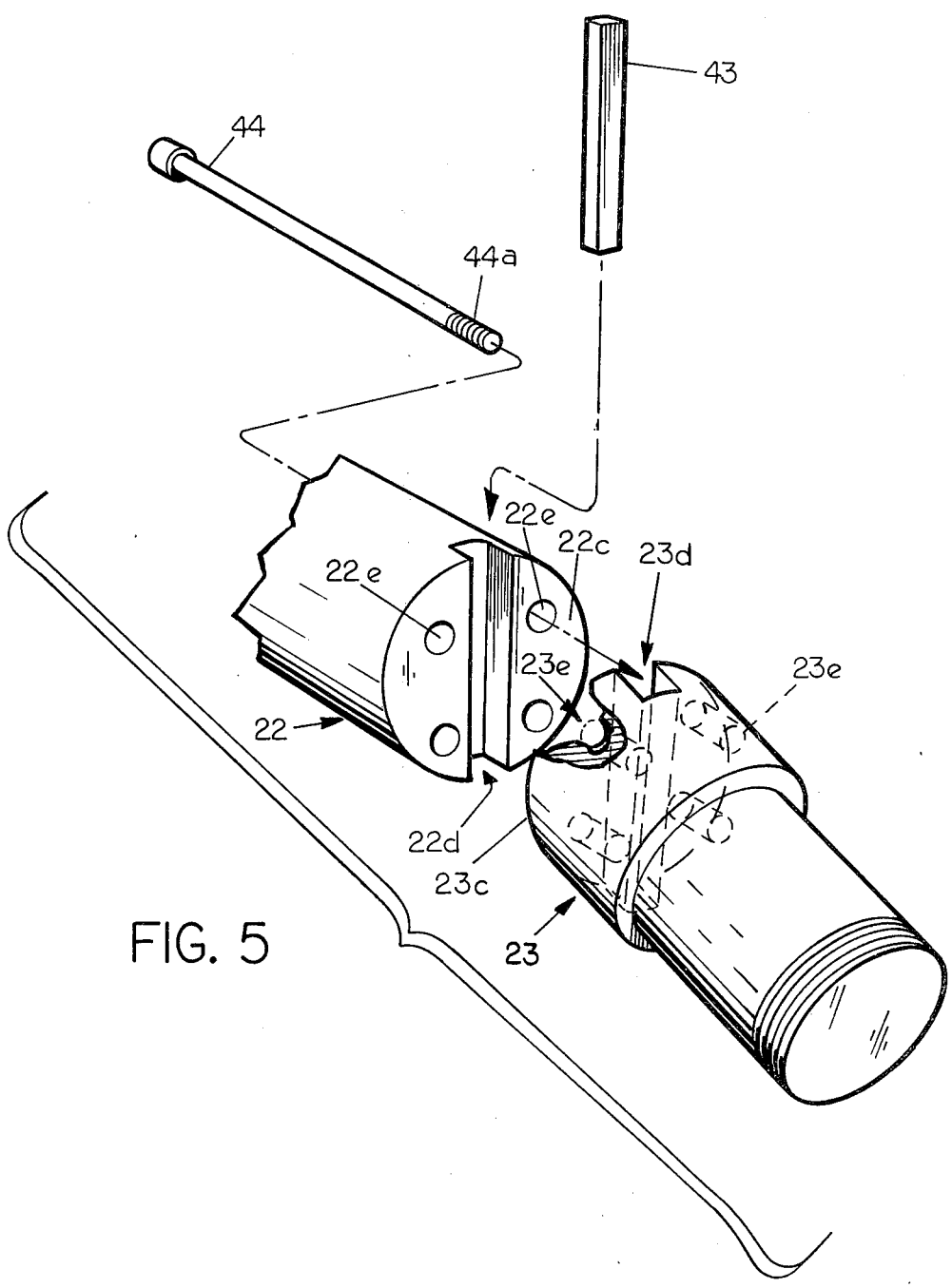
FIG. 5 is an exploded, fragmentary, perspective view showing the axle members of the assembly machine isolated from associated apparatus.

Although it will be readily appreciated and understood by an ordinarily skilled artisan that the fixed axles 22 and 23 may be separately or independently mounted without departing from the novel features of the present invention, direct interconnection or coassembly of the axles is preferred and, among other advantages, will expedite and facilitate precise axially angulated orientation of the axles relative to each other. Moreover, direct interconnection of the axles 22 and 23, in the manner to be hereinafter described, will expedite reassembly and proper orientation of the various associated intercooperating members of the assembly device; particularly, in the event that disassembly of the device is necessitated for purposes of maintenance or repair. Accordingly, a preferred manner of providing direct interconnection of the axles 22 and 23 is depicted in FIG. 5 where, for purposes of clarity, the respective axles and their associated interconnecting or interlocking elements are depicted in disassembled relationship. As depicted, the axles 22 and 23 have interfacing end faces 22c and 23c respectively having transverse central slots providing keyways 22d and 23d in which to snugly receive and commonly share an axially elongated rectangular key 43. To accommodate the desired axial angularity between the axles 22 and 23, the end faces 22c and 23c are also designed to abut one another along an interfacial plane of abutment which is tapered relative to the central axis of at least one of the axles 22 or 23. In the preferred form shown, such tapered plane of abutment is achieved by providing the non-slotted portions of the end face 23c with a planar surface which is tapered relative to the central axis of its axle 23, and by similarly providing the non-slotted portions of the end face 22c with a planar surface which is perpendicular relative to the central axis of its axle 22. Securement of the axles 22 and 23 in rigid endwise abutting relationship is provided by a plurality of axially elongated fastening pins, such as the axially elongated bolt 44, which are respectively adapted to be received through marginally interspaced bores 22e extending lengthwise through the axle 22 and which respectively have a threaded end 44a adapted to be secured in threaded openings, such as 23e, marginally provided in the end face 23c of the axle 23. The bolts when thus secured into the axle 23 firmly support the latter and securely retain it in cantilevered end-to-end abutting relationship with the fixed axle 22.

It will also be readily apparent that although the present invention has been described in terms of a preferred embodiment suitable for the assembly of resilient insert liners in mating closure caps, such preference is merely illustrative of one among many types of mating parts that are susceptible to assembly by employing the inventive concepts and practices herein described and claimed. Accordingly, it is not the purpose of the foregoing description to limit the patent granted hereon otherwise than as may be necessitated by the scope of the appended claims.

We claim:

1. A method of assembling a pre-shaped pair of coaxially mating parts shaped to interfit in assembled relationship one within the other and comprising the steps of:

arranging said pair of mating parts in unassembled positionally oriented relationship with the corresponding interfitting portions thereof respectively disposed in adjacent confronting relationship;

rotating said pair of mating parts while in such positionally oriented relationship in a first arcuate path lying in a plane disposed transversely to the axis of coaxial alignment of said mating parts;

concurrently rotating an axially elongated assembly member in rotational synchronization and in endwise confronting relationship with said mating parts, but in a second arcuate path deployed in adjacent oblique planar relationship with the plane of said first arcuate path and with the elongate axis of said assembly member positioned transversely to said second orbital path and in endwise alignment with said mating parts; and correlating the oblique planar relationship and relative interspacing of said first and second arcuate paths to cause said assembly member to uniformly advance and retreat relative to said first arcuate path and during such advance to forcefully urge said mating parts into assembled interfitting relationship with one another.

2. A method as defined in claim 1, including restraining said assembly member against axial movement relative to said second arcuate path.

3. A method as defined in claim 2, including arranging and rotating a host of correspondingly oriented pairs of said mating parts in succession in said first arcuate path, and rotating a host of correspondingly oriented assembly members in succession in said second arcuate path for successively assembling said host of mating parts.

4. A method as defined in claim 2, wherein one of said mating parts is a closure cap.

5. A method as defined in claim 2, wherein the restraining of said assembly member is carried out by yieldably biasing said assembly member against said axial movement.

6. A method as defined in claim 4, wherein one of said mating parts is an insert liner.

7. A method as defined in claim 6, wherein said insert liner is flexible and is adapted to interfit in said closure cap in snap-fit relationship.

8. A rotary assembly device for assembling a pre-shaped pair of coaxially mating parts shaped to interfit in assembled relationship one within the other and comprising:

means for carrying said pair of mating parts in unassembled positionally oriented relationship with interfitting portions thereof respectively disposed in adjacent confronting relationship while concurrently rotating said mating parts in a first arcuate path lying in a plane disposed transversely to the axis of coaxial alignment of said mating parts;

an axially elongated assembly member;

means for carrying said assembly member and concurrently rotating the same in a second arcuate path adjacently interspaced from said first arcuate path and lying in a plane deployed in adjacent oblique planar relationship relative to the plane of said first arcuate path, said last-mentioned means being operative to rotate said assembly member in rotational synchronization with the mating parts carried by the first-mentioned means and being adapted to carry said assembly member with the elongate axis thereof positioned transversely to said second arcuate path and in endwise alignment with said mating parts; and the oblique planar relationship and interspacing of first and second arcuate paths being correlated to cause said assembly member to uniformly advance and retreat relative to said mating parts and during such advance to forcefully urge said mating parts into assembled interfitting relationship with one another.

9. A rotary assembly device as defined in claim 8, including means for restraining said assembly member against axial movement relative to said second arcuate path.

10. A rotary assembly device as defined in claim 9, wherein said restraining means comprises means for yieldably biasing said assembly member against axial movement relative to said second arcuate path.

11. A rotary assembly device as defined in claim 9, wherein said means for carrying and rotating said mating parts includes means for carrying a host of correspondingly oriented pairs of said mating parts and concurrently rotating same in succession in said first arcuate path, and wherein said means for carrying and rotating said assembly member includes means for carrying and rotating a host of correspondingly oriented assembly members in succession in said second arcuate path for successively assembling said host of mating parts.

12. A rotary assembly device as defined in claim 8, wherein one of said mating parts is a closure cap.

13. A rotary assembly device as defined in claim 12, wherein one of said mating parts is an insert liner.

14. A rotary assembly device as defined in claim 13, wherein said insert liner is shaped to interfit in said closure cap in snap-fit assembled relationship.

15. A rotary assembly device for assembling preshaped pairs of mating parts shaped to interfit in assembled relationship one within the other and comprising:

an interspaced pair of first and second rotatable members mounted for synchronous rotation about fixed first and second central axes respectively, said fixed central axes being deployed in angular relationship relative to one another and orienting said rotatable members in confronting and obliquely disposed rotational planes relative to one another, whereby during synchronous rotation oppositely facing marginal portions of said rotatable members are caused to uniformly advance and retreat relative to one another during each rotational revolution of said rotatable members;

said first rotatable member including means providing a marginally interspaced array of assembly stations facing towards said second rotatable member;

delivery means at a fixed location along the rotational path of travel of said first rotatable member for delivering an unassembled pair of said mating parts to each of said assembly stations;

each of said assembly stations being adapted to receive a pair of said mating parts from said delivery means and to carry said pair of mating parts positioned in adjacent confronting relationship with one another;

said second rotatable member carrying a marginally interspaced array of plunger members projecting respectively towards one each of said assembly stations;

means for synchronously rotating said rotatable members to thereby cause oppositely facing marginal portions of said rotatable members to advance relative to one another and to thereby cause said plunger members to respectively advance relative to one each of said assembly stations and forcefully urge the pair of mating parts at each said assembly station into interfitting relationship.

16. A rotary assembly device as defined in claim 15, wherein said first rotatable member includes means defining a peripheral array of interspaced pockets in which to individually receive and position an unassembled pair of said mating parts with their respective interfitting portions disposed in adjacent confronting relationship with one another, and said pockets being respectively located at one each of said assembly stations.

17. A rotary assembly device wherein the means as defined in claim 16 comprises a pair of adjacent interspaced pocket wheels defining a peripheral array of mutually aligned pockets, and wherein the pockets defined in one of said pocket wheels are respectively adapted to receive and position one of said pair of mating parts, and wherein the pockets defined in the other of said pocket wheels are respectively adapted to receive and position the other one of said pair of mating parts.

18. A rotating assembly device as defined in claim 16, wherein one of said mating parts is a closure cap.

19. A rotary assembly device as defined in claim 17, wherein one of said mating parts is an insert liner.

20. A rotary assembly device as defined in claim 19, wherein the other one of said mating parts is a closure cap.

21. In a rotary assembly device as defined in claim 15, wherein said first and second rotatable members are coupled together for synchronous rotation by a flexible annular collar.

* * * * *

UNITED STATES PATENT AND TRADEMARK OFFICE
CERTIFICATE OF CORRECTION

PATENT NO. : 4,177,548

DATED : December 11, 1979

INVENTOR(S) : Jon R. Yarick and Nelson J. Franks

It is certified that error appears in the above-identified patent and that said Letters Patent are hereby corrected as shown below:

Col. 6, line 49, "should" should be --head--.

Col. 8, line 52, "whown" should be --shown--;
line 63, "14a" should be --14b--;

Signed and Sealed this

Fifteenth Day of July 1980

[SEAL]

Attest:

SIDNEY A. DIAMOND

Attesting Officer

Commissioner of Patents and Trademarks